US010185987B2

(12) United States Patent
Jhamtani et al.

(10) Patent No.: US 10,185,987 B2
(45) Date of Patent: Jan. 22, 2019

(54) IDENTIFYING THE END OF AN ON-LINE CART SESSION

(71) Applicant: Adobe Systems Incorporated, San Jose, CA (US)

(72) Inventors: Harsh Jhamtani, Kanpur (IN); Shriram V. S. Revankar, Bangalore (IN); Moumita Sinha, Kolkata (IN); Balaji Vasan Srinivasan, Chennai (IN); Anandhavelu Natarajan, Kangayam (IN)

(73) Assignee: Adobe Inc., San Jose, CA (US)

( * ) Notice: Subject to any disclaimer, the term of this patent is extended or adjusted under 35 U.S.C. 154(b) by 713 days.

(21) Appl. No.: 14/808,883

(22) Filed: Jul. 24, 2015

(65) Prior Publication Data

US 2017/0024807 A1 Jan. 26, 2017

(51) Int. Cl.
| | |
|---|---|
| *G06Q 30/00* | (2012.01) |
| *G06Q 30/06* | (2012.01) |
| *H04L 29/08* | (2006.01) |
| *G06N 7/00* | (2006.01) |

(52) U.S. Cl.
CPC ......... *G06Q 30/0641* (2013.01); *G06N 7/005* (2013.01); *H04L 67/02* (2013.01); *H04L 67/22* (2013.01); *G06Q 30/0601* (2013.01)

(58) Field of Classification Search
CPC . G06Q 30/0633; G06Q 30/0641; G06Q 30/02
USPC ............................................... 705/26.8, 27.1
See application file for complete search history.

(56) References Cited

U.S. PATENT DOCUMENTS

| | | | | |
|---|---|---|---|---|
| 6,338,066 B1* | 1/2002 | Martin | ................ | G06F 17/3089 707/708 |
| 7,673,340 B1* | 3/2010 | Cohen | ................ | G06F 11/3438 379/266.08 |
| 2002/0062245 A1* | 5/2002 | Niu | ........................ | G06Q 30/02 705/14.51 |

(Continued)

FOREIGN PATENT DOCUMENTS

WO WO-2014124333 A1 * 8/2014 ......... G06Q 30/0201

OTHER PUBLICATIONS

Windsor Circle; Customer Retention Software Leader Windsor Circle Closes $5.25M Series B from Comcast Ventures and Existing Investors, Aug. 30, 2014, NewsRx, p. 84 (Year: 2014).*

(Continued)

*Primary Examiner* — Brittney N Miller
(74) *Attorney, Agent, or Firm* — Wolfe-SBMC

(57) ABSTRACT

In embodiments of identifying the end of an on-line cart session, an analytics application captures user click inputs on pages of a Web site, where the user click inputs include adding one or more items for purchase to an on-line cart associated with the Web site. The analytics application then utilizes a predictive model, as well as user and session features of the on-line cart session, to predict whether a previous user click input is the last user click input associated with the on-line cart session, indicating an end of the session. A notification can then be provided that the on-line cart session has ended based on the prediction of the last user click input associated with the on-line cart session. The analytics application or the marketer can then retarget a user associated with the on-line cart session, such as with a message pertaining to the on-line cart session.

20 Claims, 5 Drawing Sheets

(56) References Cited

U.S. PATENT DOCUMENTS

2005/0021417 A1* 1/2005 Kassan ............. G06Q 30/0203
705/14.51
2011/0246406 A1* 10/2011 Lahav ................ G06Q 30/02
706/46
2012/0323682 A1* 12/2012 Shanbhag .......... G06Q 30/0601
705/14.51

OTHER PUBLICATIONS

Kukar-Kinney,"The determinants of consumers' online shopping cart abandonment", Journal of the Academy of Marketing Science, 38(2), Mar. 2009, 11 pages.
Moe,"Dynamic Conversion Behavior at E-Commerce Sites", Management Science vol. 50, No. 3,, Mar. 2004, pp. 326-335.
Paden,"Virtual Cart Abandonment: Addressing Hedonic and Utilitarian Shopping Motives", Proceedings of ASBBS, 17(1), 2010, 5 pages.

* cited by examiner

IDENTIFYING THE END OF AN ON-LINE CART SESSION

BACKGROUND

Every day, millions of computer users visit Web pages as they surf the Internet, some by seeking a specific Web site, such as to purchase products, and others by simply clicking from one Web page to the next. Many marketers, such as service providers and product manufacturers, seek to attract customers to a Web page or a Web site. Just as important, the marketers want to keep customers engaged with the Web site, or pages of the Web site, once a customer has navigated to visit a particular Web page during an on-line session. Generally, customers may browse various product pages, search for products, and add or remove products from an on-line shopping cart before buying one or more of the products. However, not every on-line session started by a customer ends with a completed purchase and often customers leave a Web site, abandoning unpurchased products in the on-line shopping cart.

Rather than selecting to leave a Web site, effectively ending an on-line shopping experience, some customers may simply suspend input activity without an indication of abandoning the on-line cart. Moreover, a lack of customer input activities on a Web site for some extended duration of time does not necessarily imply the end of an on-line shopping session. Without an indication that an on-line shopping session has ended, a marketer does not want to be hasty in sending a reminder email or other communication to a customer, but would rather wait for some indication or confirmation that the on-line shopping session has ended. The purchasing behavior varies from customer to customer. For example, some customers are impulsive buyers who complete a purchase soon after adding products for purchase to an on-line shopping cart. Alternatively, there are customers who take some time before completing an actual purchase. During this time, a customer may be comparative shopping and looking at other ecommerce sites, may be researching and/or discussing products with friends, or just putting more thought into a purchase.

Typically, an on-line shopping cart is deemed abandoned if there is no activity on a Web site for a fixed-time interval, such as thirty minutes. However, as noted above, the click-through rates can vary from one customer to the next, and the fixed-time interval is not an adequate "one-size-fits-all" solution on which to base marketing decisions. The follow-up actions by a marketer based on a determination that an on-line session has ended after thirty minutes of inactivity may create customer dissatisfaction, brand irritation, inappropriate timing for retargeting, and at least a poor user experience when receiving a follow-up communication for an on-line shopping cart session that the user has not in fact ended.

SUMMARY

This Summary introduces features and concepts of identifying the end of an on-line cart session, which is further described below in the Detailed Description and/or shown in the Figures. This Summary should not be considered to describe essential features of the claimed subject matter, nor used to determine or limit the scope of the claimed subject matter.

Identifying the end of an on-line cart session is described. In one or more embodiments, an analytics application captures user click inputs on pages of a Web site, where the user click inputs include adding one or more items for purchase to an on-line cart associated with the Web site. The analytics application then utilizes a predictive model, as well as user and session features of the on-line cart session, to predict whether a previous user click input is the last user click input associated with the on-line cart session, indicating an end of the session. The last user click input is the predicted last user click input prior to the user abandoning the on-line cart. A marketer of the Web site, or user, can then be then notified that the on-line cart session has ended based on the prediction of the last user click input associated with the on-line cart session. The analytics application or the marketer may then retarget a user associated with the on-line cart session, such as with an email or other targeted message pertaining to the on-line cart session.

In aspects of identifying the end of an on-line cart session, the predictive model is developed from a data set of past on-line cart sessions and user Web site interactions of multiple previous users, where the predictive model can be used as a representation of any subsequent user that initiates an on-line cart session. Developing the predictive model includes determining a statistical distribution from the data set of the past on-line cart sessions and the user Web site interactions, where the statistical distribution is based on a time duration between successive user click inputs and a time duration after the last user click input until a defined end of a past on-line cart session. The predictive model is also developed based on determining user features and session features of the past on-line cart sessions, and based on the user Web site interactions. A classifier is then trained based on the statistical distribution, the user features, and the session features of the past on-line cart session and the user Web site interactions.

BRIEF DESCRIPTION OF THE DRAWINGS

Embodiments of identifying the end of an on-line cart session are described with reference to the following Figures. The same numbers may be used throughout to reference like features and components that are shown in the Figures.

DETAILED DESCRIPTION

Embodiments of identifying the end of an on-line cart session are described, and provide a marketer of a Web page feedback in the form of a prediction as to whether a customer has ended an on-line shopping cart session, thus abandoning unpurchased products that have been selected and placed in the on-line shopping cart. Using this information, a marketer can engage a customer for retargeting, such as by communicating an email or other notification, as soon as it becomes known that the on-line cart session of the customer has ended. An analytics application implements a predictive model that addresses the problem of being able to predict or identify the end of an on-line shopping cart session for a customer, which provides marketers a basis to make a decision in real-time whether to retarget the customer. As noted above, a purchase does not necessarily mean that an on-line cart session has ended, nor does the lack of a purchase for a period of time infer an end of the on-line cart session. The predictive model is developed from a data set of past on-line cart sessions and user Web site interactions of multiple previous users, where the predictive model can then be used as a representation of any subsequent user that initiates an on-line cart session and abandons the on-line cart session.

While features and concepts of identifying the end of an on-line cart session can be implemented in any number of different devices, systems, networks, environments, and/or configurations, embodiments of identifying the end of an on-line cart session are described in the context of the following example devices, systems, and methods.

Figure 1:
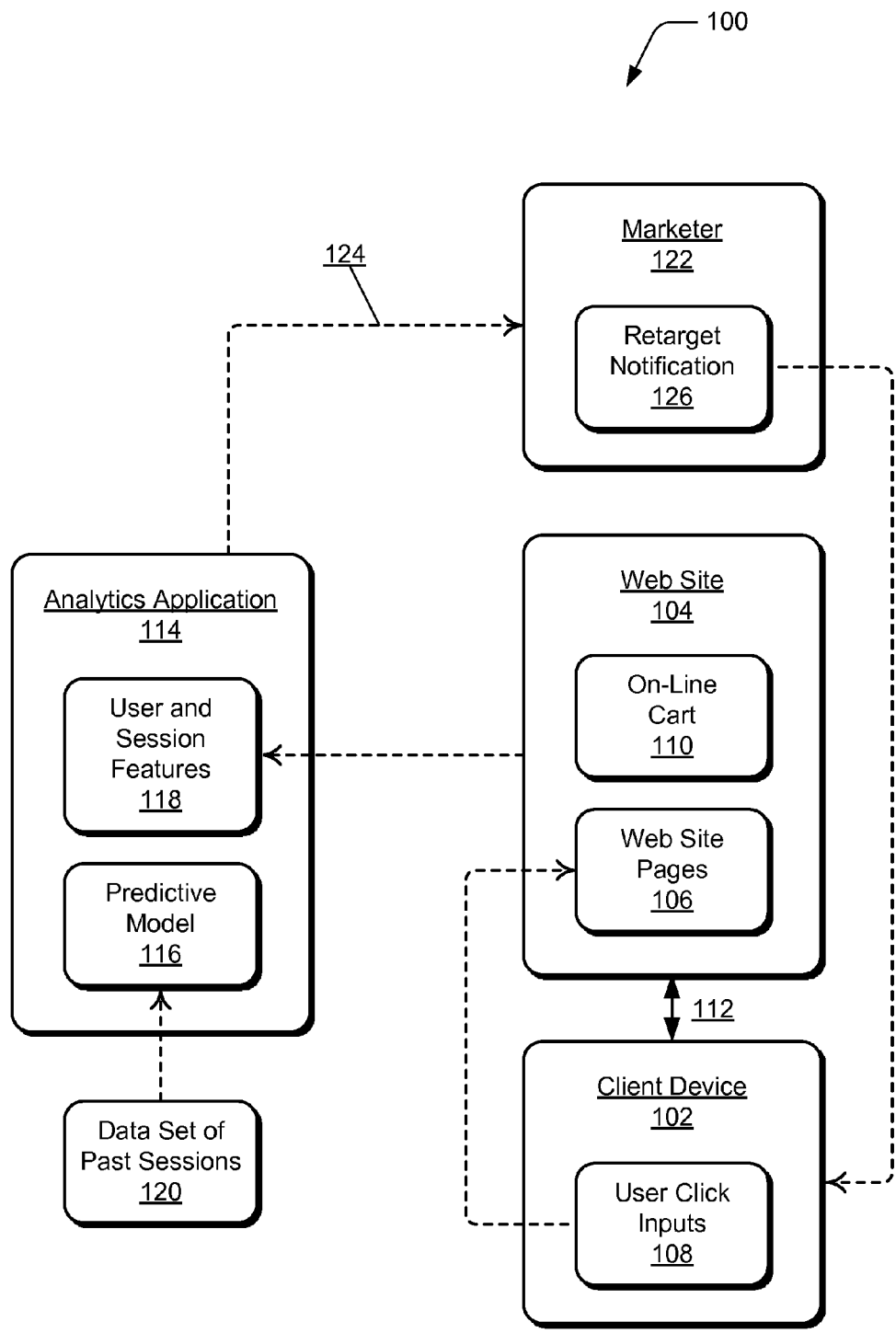
FIG. 1 illustrates an example system in which embodiments of identifying the end of an on-line cart session can be implemented.

FIG. 1 illustrates an example system 100 in which techniques for identifying the end of an on-line cart session can be implemented. The example system 100 includes a client device 102, such as any type of computer, mobile phone, tablet device, or other computing device that a consumer can use to access a Web site 104 and Web site pages 106 of the Web site. The consumer can initiate user click inputs 108, such as with a mouse or other input device, in a browser application through which the Web site pages are displayed. For example, the consumer can initiate the user click inputs 108 to browse various marketer Web sites for items such as products, services, merchandise, and other ecommerce items that may be purchased via an on-line shopping experience. In the course of on-line shopping, the consumer may add one or more items for purchase to an on-line cart 110 (also referred to as an on-line shopping cart) of the Web site 104, creating an on-line cart session 112 between the client device 102 and the Web site 104.

The example system 100 also includes an analytics application 114 that captures the user click inputs 108 on the Web site pages 106 of the Web site 104, including the user click inputs by the consumer (e.g., user of the client device 102) to add items for purchase to the on-line cart 110 that is associated with the Web site. The analytics application 114 then utilizes a predictive model 116, as well as user and session features 118 of the current on-line cart session 112, to predict whether a previous user click input is the last user click input associated with the on-line cart session, indicating an end of the session. Any user click input, such as to add or remove an item from an on-line cart session, may be the last user click input associated with the on-line cart (e.g., the predicted last user click input prior to the user abandoning the on-line cart). The predictive model 116 can be utilized to predict whether a particular user click input is the last one, particularly if a successive user click input is not detected, and the process is repetitive until the last user click input is predicted.

The predictive model 116 is developed from a data set of past on-line cart sessions 120 and user Web site interactions of multiple previous users, where the predictive model can be used as a representation of any subsequent user that initiates an on-line cart session. As further described with reference to FIGS. 2 and 3, developing the predictive model includes determining a statistical distribution (also referred to herein as the "ground truth" determination) from the data set of the past on-line cart sessions 120 and the user Web site interactions, where the statistical distribution is based on a time duration between successive user click inputs and a time duration after the last user click input until a defined end of a past on-line cart session. The predictive model 116 is also developed based on determining user features and session features of the past on-line cart sessions, and based on the user Web site interactions. A classifier is then trained based on the statistical distribution, the user features, and the session features of the past on-line cart session and the user Web site interactions.

The user and session features 118 of the on-line cart session 112 are also further described with reference to FIGS. 2 and 3. The user and session features 118 include current hit features, where a "hit" indicates a navigation or user click input 108. For example, the current hit features of the on-line cart session 112 can include a type of the Web page 106, a browser application type implemented by the client device 102, a width and height of the browser window as displayed at the client device, and a time of the day. The current session features can include the number of hits recorded in the current on-line session, the time duration of the current session, the time difference between the current and last user click input 108, and the total number of items that have been added to the on-line cart 110 in the current on-line cart session.

As indicated above, the analytics application 114 is implemented to predict whether a previous user click input is the last user click input associated with the on-line cart session 112, indicating an end of the session. A marketer 122 of the Web site 104 can then be notified 124 that the on-line cart session 112 has ended based on the prediction of the last user click input associated with the on-line cart session. The analytics application 114 and/or the marketer 122 may then initiate a retarget notification 126 that retargets the consumer who is associated with the on-line cart session, such as with an email message or other type of communication or notification pertaining to the on-line cart session. In implementations, the analytics application 114 may provide a notification directly to the consumer and not the marketer, or vice-versa.

Figure 2:
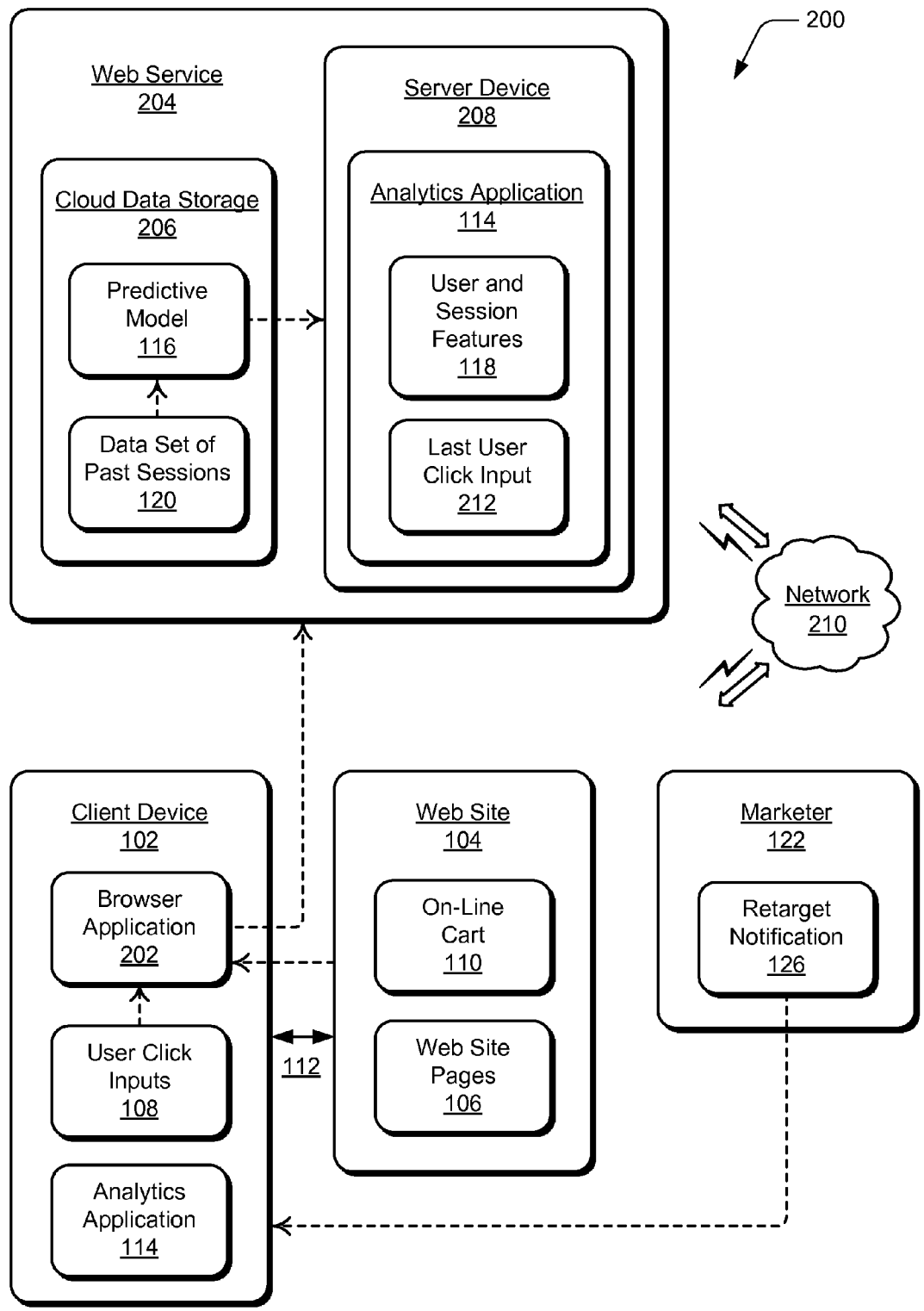
FIG. 2 further illustrates the example system in accordance with one or more embodiments of identifying the end of an on-line cart session.

FIG. 2 further illustrates the example system 100 that is shown and described with reference to FIG. 1, implemented in an overall system 200 in which techniques for identifying the end of an on-line cart session can be implemented. The example system 200 includes the client device 102 that a consumer (e.g., a user of the device) uses to access the Web site 104, and the pages 106 of the Web site, through a browser application 202 on the client device. For example, the consumer can initiate the user click inputs 108, such as with a mouse or other input device, to browse various marketer Web sites for items such as products, services, merchandise, and other ecommerce items that may be purchased via an on-line shopping experience. In the course of on-line shopping, the consumer may add one or more items for purchase to the on-line cart 110 that is associated with the Web site 104, creating the on-line cart session 112. In embodiments, the client device 102 may implement some or all of the features of the analytics application 114, as further described below. Further, the client device 102 can be implemented with various components, such as a processing system and memory, and with any number and combination of different components as further described with reference to the example device shown in FIG. 6.

The example overall system 200 also includes a Web service 204 that the marketer 122 can access via a computing device. The Web service 204 is representative of any number of cloud-based access sites from which data and information is available, such as via the Internet, when posted to the Web, on an intranet site, on an external website, or any other similar location for on-line and/or network-based access. In embodiments, the Web service 204 may be implemented as a marketing campaign service, product tracking service, and/or consumer analytics on-line service, which the marketer 122 can subscribe to for analysis of the Web site 104 as users, consumers, and purchasers browse the Web site pages 106.

The Web service 204 includes cloud data storage 206 that may be implemented as any suitable memory, memory device, or electronic data storage for network-based data storage. The Web service 204 also includes a server device 208 that is representative of one or multiple hardware server devices of the Web service. In this example, the server device 208 implements the analytics application 114, which is described with reference to FIG. 1 and is described in more detail below. The analytics application 114 can be implemented as a software application or module, such as executable software instructions (e.g., computer-executable instructions) that are executable with a processing system of the server device 208 to implement embodiments of identifying the end of an on-line cart session. The analytics application 114 can be stored on computer-readable storage media, such as any suitable memory device (e.g., the cloud data storage 206) or electronic data storage implemented by the server device 208 and/or by the Web service 204. The cloud data storage 206 and/or the server device 208 may include multiple server devices and applications, and can be implemented with various components, such as a processing system and memory, as well as with any number and combination of different components as further described with reference to the example device shown in FIG. 6.

Any of the devices, servers, and/or services described herein can communicate via a network 210, such as for data communication between the client device 102, the Web site 104, the marketer 122, and/or the Web service 204. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In this example, the cloud data storage 206 maintains the predictive model 116 and the data set of past on-line cart sessions 120. The analytics application 114 that is implemented at the Web service 204 captures the user click inputs 108 on the Web site pages 106 of the Web site 104, including the user click inputs by the consumer (e.g., user of the client device 102) to add items for purchase to the on-line cart 110 that is associated with the Web site. As described above, the analytics application 114 then utilizes the predictive model 116, as well as the current user and session features 118 of the on-line cart session 112, to predict whether a previous user click input is the last user click input 212 associated with the on-line cart session, indicating an end of the session.

Figure 3:
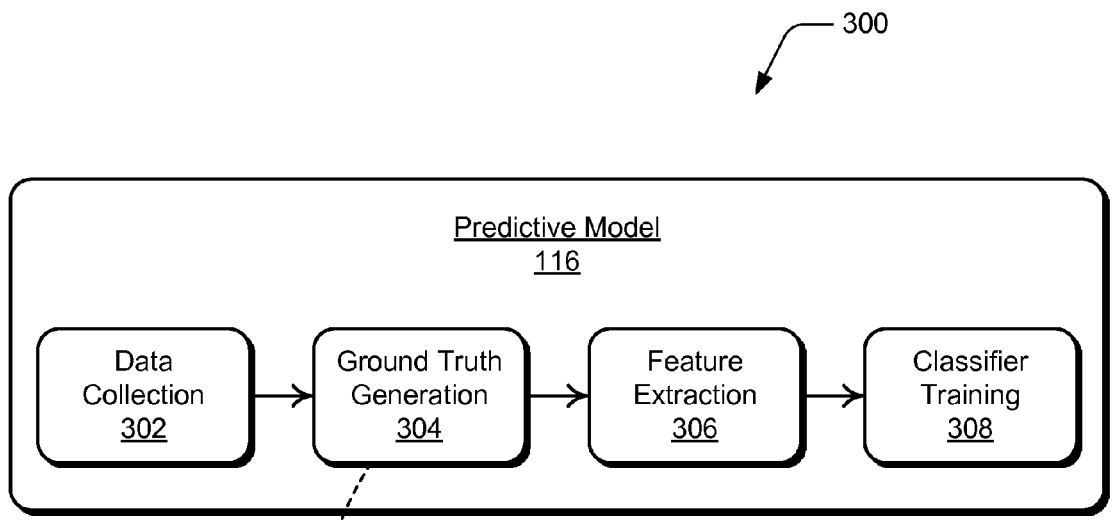
FIG. 3 illustrates example details of developing a predictive model that can be utilized in accordance with one or more embodiments of identifying the end of an on-line cart session.

FIG. 3 further illustrates details 300 of developing the predictive model 116 in embodiments of identifying the end of an on-line cart session. Initially, data collection 302 involves extracting the features from anonymous consumers' activities during on-line sessions, and developing the statistical distribution (e.g., ground truth generation 304) on the collected training data, which is referred to above as the data set of past sessions 120. The ground truth generation 304 pertains to whether a particular user click input (e.g., a "hit") is an end of an on-line session or not. For each consumer on-line session, the time difference between successive clicks during an on-line session over a several month period of time can be collected, where an assumption is that the data follows a chi-squared k distribution, with k being the mean time difference for a particular consumer. Then, for each consumer as a data point, the cut-off time duration of no activity (e.g., no user click inputs) is the 99.5 percentile of the corresponding chi-square k distribution. Accordingly, the current on-line cart session for a consumer is determined or predicted as having ended if there is no activity by that consumer for the monitored time interval.

Figure 4:
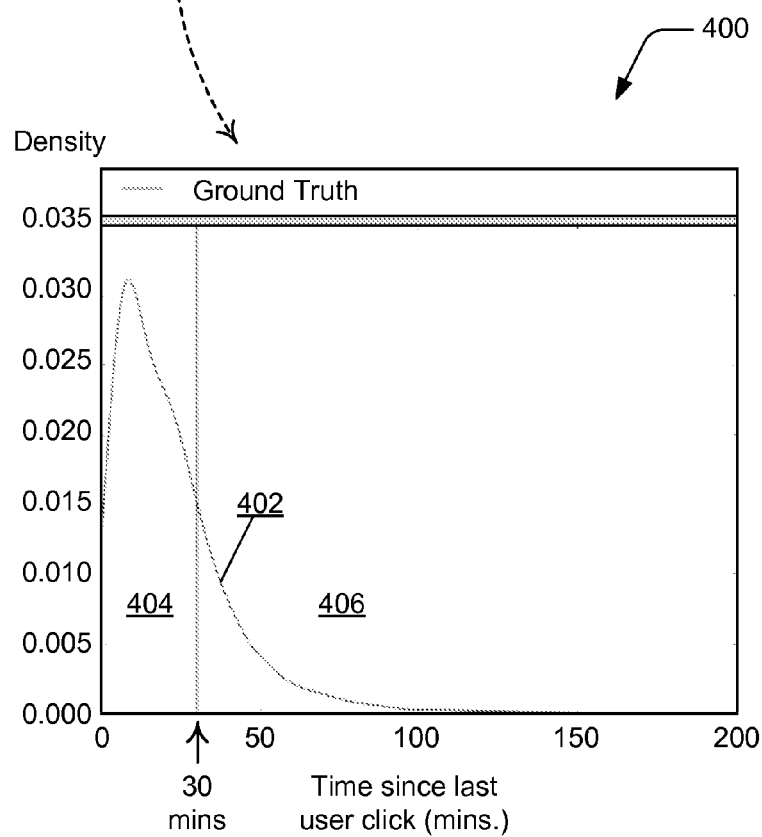
FIG. 4 illustrates a graph of a statistical distribution based on user click inputs used to develop the predictive model that is utilized in accordance with one or more embodiments of identifying the end of an on-line cart session.

FIG. 4 illustrates a graph 400 of the observed statistical distribution 402 of wait time after the last user click input before defining the end of an on-line session. The graph 400 illustrates that most of the on-line sessions end before thirty minutes (as indicated in the graph region 404, before thirty minutes), and indicates that the conventional technique of defining the end of an on-line session after the fixed duration of thirty minutes of no activity is not accurate, or is only accurate for a smaller percentage of the consumers (as indicated in the graph region 406, after thirty minutes). Thus, the determined statistical distribution 402 of consumer-specific wait times are more appropriate as compared to the fixed thirty minute duration of no-activity for defining the end of an on-line session.

The development of the predictive model 116 also includes feature extraction 306 pertaining to the anonymous consumers' activities during the on-line sessions (returning to the discussion of FIG. 3). To classify a current user click input, features are extracted from the past on-line sessions, as well as from the current on-line session. Various classifiers, such as Support Vector Machine (SVM) and Random Forest, can be used to classify a user click input as an end of a cart session. In implementations, the consumer activity features are identified in one of three categories of current hit features, current session features, or previous session features.

The current hit features of an on-line cart session can include a type of the Web page, a browser application type, a height and/or width of the browser window as displayed at a client device, the browser application resolution, the type of operating system of the client device, whether cookies are allowed to be saved, the device identifier of the client device, the time spent in the current on-line session, the time since the last purchase, the day of the week, and/or a time of the day. The current session features can include the number of hits recorded in the current on-line session, the time duration of the current session, the time difference between the current and last user click input, and the total number of items that have been added to an on-line cart in the current on-line cart session.

The previous session features can include the duration of the previous on-line session, the number of user click inputs in the session, the total number of items added to the on-line shopping cart in the previous session, the number of items purchased in the previous session, the number of previous sessions within a last number of months (e.g., a frequency of on-line sessions), the median session length, the mean session length, the total number of units added to the on-line shopping cart in all of the sessions, the average number of units added across all of the sessions, the total number of items purchased in the last number of months, and/or the time since the previous on-line session.

The predictive model 116 also includes classifier training 308 to train a Random Forest classifier that is implemented to identify whether a current on-line session has ended or not. The classifier is trained based on the extracted features and the ground truth generation to model the end of an on-line session. Although the predictive model is discussed as a Random Forest classifier, similar classification models can be used, such as a Support Vector Machine (SVM) or Logistic Regression.

Example method 500 is described with reference to FIG. 5 in accordance with one or more embodiments of identifying the end of an on-line cart session. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
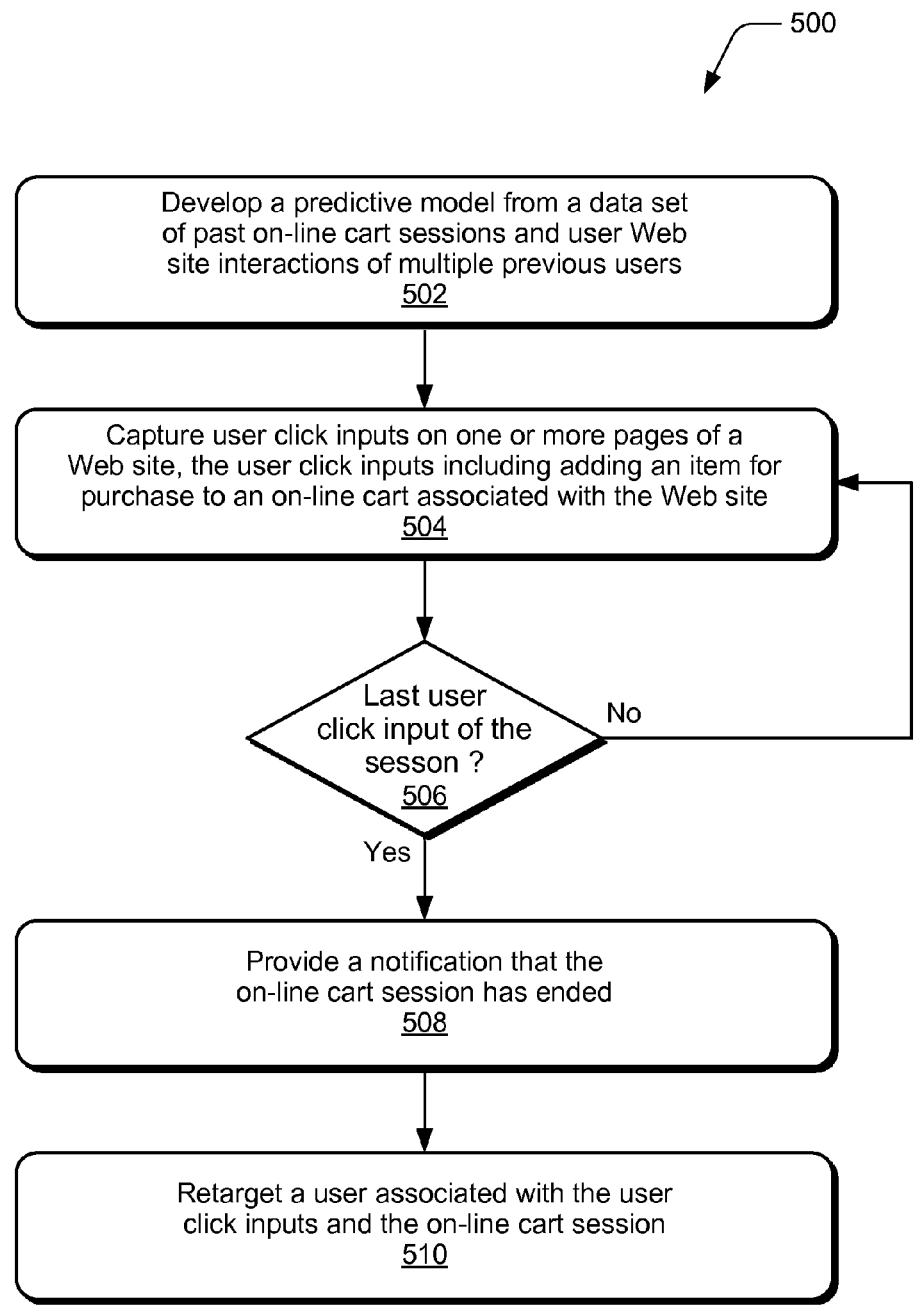
FIG. 5 illustrates an example method of identifying the end of an on-line cart session in accordance with one or more embodiments.

FIG. 5 illustrates example method(s) 500 for identifying the end of an on-line cart session, and is generally described with reference to the example system shown in FIGS. 1 and 2. The order in which the method is described is not intended to be construed as a limitation, and any number or combination of the method operations can be combined in any order to implement a method, or an alternate method.

At 502, a predictive model is developed from a data set of past on-line cart sessions and user Web site interactions of multiple previous users. For example, the analytics application 114 develops the predictive model 116 based on the multiple previous users as a representation of any subsequent user that initiates an on-line cart session. The predictive model is developed by determining a statistical distribution from the data set of the past on-line cart sessions and the user Web site interactions. The statistical distribution (also referred to as the "ground truth") is based on a time duration between successive user click inputs and a time duration after the last user click input until a defined end of a past on-line cart session. The predictive model is further developed by determining user features and session features of the past on-line cart sessions and the user Web site interactions (e.g., the data set of past on-line cart sessions 120). A classifier is then trained based on the statistical distribution, the user features, and the session features of the past on-line cart session and the user Web site interactions.

At 504, user click inputs on one or more pages of a Web site are captured, where the user click inputs include adding an item for purchase to an on-line cart associated with the Web site. For example, the analytics application 114 captures the user click inputs 108 on the Web site pages 106 of the Web site 104, including the user click inputs by the consumer (e.g., user of the client device 102) to add items for purchase to the on-line cart 110 that is associated with the Web site.

At 506, a prediction is made as to whether the previous user click input is the last user click input associated with the on-line cart session, indicating an end of the on-line cart session. For example, the analytics application 114 utilizes the predictive model 116, as well as user features and session features 118 of the current on-line cart session 112, to predict whether the previous user click input is the last user click input associated with the on-line cart session, indicating the end of the on-line cart session.

If the previous user click input is not the last user click input of the on-line cart session (i.e., "No" from 506), then the method continues to capture the user click inputs (at 504) and predict whether the previous user click input is the last user click input of the on-line cart session (at 506). If the previous user click input is predicted to be the last user click input of the on-line cart session (i.e., "Yes" from 506), then at 508, a notification is provided that the on-line cart session has ended. For example, the analytics application 114 notifies the marketer 122 of the Web site 104, or notifies another user, application, and/or service, that the on-line cart session of the consumer has ended based on predicting the last user click input associated with the on-line cart session.

At 510, a user associated with the user click inputs and the on-line cart session is retargeted. For example, the analytics application 114 and/or the marketer 122 of the Web site 104 retargets the user (e.g., the consumer) who is associated with the on-line cart session 112 when predicting (at 506) the last user click input associated with the on-line cart session. The user of the client device 102 who is associated with the on-line cart session 112 can be retargeted by communicating an email message or other type of communication or notification pertaining to the on-line cart session to the client device 102 that is associated with the user.

Figure 6:
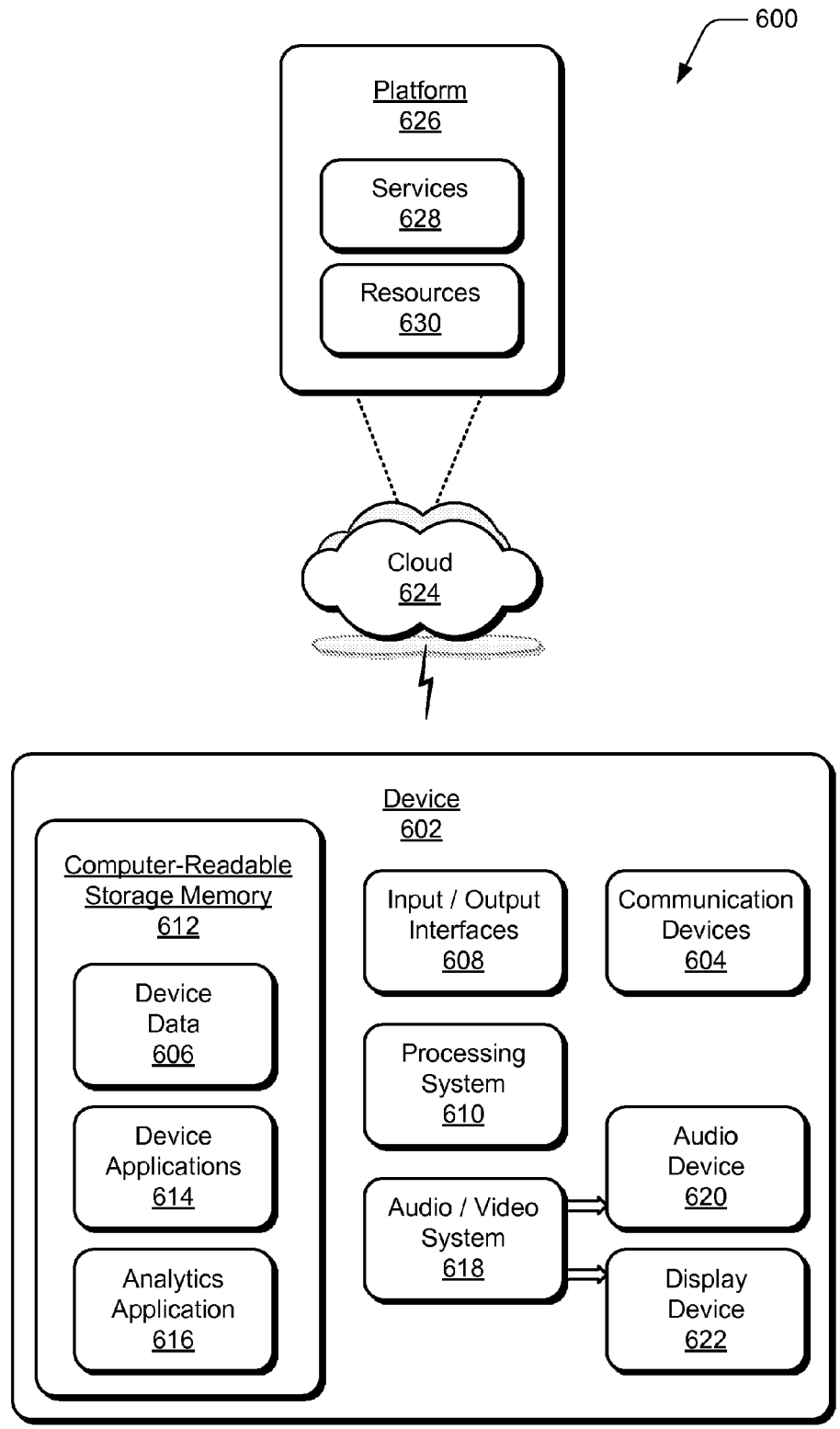
FIG. 6 illustrates an example system with an example device that can implement one or more embodiments of identifying the end of an on-line cart session.

FIG. 6 illustrates an example system 600 that includes an example device 602, and in which techniques for identifying the end of an on-line cart session can be implemented. The example device 602 can be implemented as any of the computing devices and/or services (e.g., server devices) described with reference to the previous FIGS. 1-5, such as any type of computing device, client device, or server device. For example, the client device 102 and/or the server device 208, as well as the Web service 204 and the cloud data storage 206 shown in FIGS. 1 and/or 2, may be implemented as the example device 602.

The device 602 includes communication devices 604 that enable wired and/or wireless communication of device data 606, such as data that is communicated between the devices in a network, data that is being received, data scheduled for broadcast, data packets of the data, data that is synched between the devices, etc. The device data 606 can include any type of communication data, as well as audio, video, and/or image data, such as application data that is generated by applications executing on the device. The communication devices 604 can also include transceivers for cellular phone communication and/or for network data communication.

The device 602 also includes data input/output (I/O) interfaces 608, such as data ports and data network interfaces that provide connection and/or communication links between the device, data networks, and other devices. The I/O interfaces can be used to couple the device to any type of components, peripherals, and/or accessory devices, such as a digital camera device that may be integrated with the device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage memory 612, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device applications also include an analytics application 616 that implements the described techniques for identifying the end of an on-line cart session, such as when the example device 602 is implemented as the client device 102 shown in FIG. 1 and/or the server device 208 shown in FIG. 2. Examples of the analytics application 616 include the analytics application 114 that is implemented by the client device 102 and/or the server device 208 that is implemented by the Web service 204, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device. In embodiments, at least part of the techniques described for identifying the end of an on-line cart session may be implemented in a distributed system, such as over a "cloud" 624 in a platform 626. The cloud 624 includes and/or is representative of the platform 626 for services 628 and/or resources 630.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of identifying the end of an on-line cart session have been described in language specific to features and/or methods, the appended claims are not necessarily limited to the specific features or methods described. Rather, the specific features and methods are disclosed as example implementations of identifying the end of an on-line cart session, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method implemented to identify when a current on-line cart session associated with a user has ended and provide an indication of when to retarget the user, the method comprising:
    capturing user click inputs on one or more pages of a website, the user click inputs captured by an analytics application on a server device during the current on-line cart session, the user click inputs including adding an item for purchase to an on-line cart associated with the website;
    predicting, by the analytics application using a predictive model with a trained classifier, whether a previous user click input is a last user click input associated with the current on-line cart session, the last user click input indicating an end of the current on-line cart session, the predicting based at least in part on a duration of inactivity during the current on-line cart session, the predictive model developed from a data set of past on-line cart sessions and user website interactions of multiple previous users and by determining a statistical distribution from the data set, wherein the statistical distribution is based on a time duration between successive user click inputs and a time duration after the last user click input until a defined end of a past on-line cart session, wherein the trained classifier is trained based at least in part on the statistical distribution; and
    in response to the predicting that one of the user click inputs is the last user click input, providing a notification that the current on-line cart session has ended.

2. The method as recited in claim 1, further comprising: retargeting the user associated with the user click inputs and the current on-line cart session in response to said predicting the last user click input associated with the current on-line cart session.

3. The method as recited in claim 2, wherein said retargeting the user comprises communicating a message pertaining to the current on-line cart session to a computing device associated with the user.

4. The method as recited in claim 1, wherein said predicting the last user click input associated with the current on-line cart session is based on the predictive model, and is based on user features and session features of the current on-line cart session.

5. The method as recited in claim 4, wherein the user features and session features of the current on-line cart session comprise one or more of:
a number of the user click inputs in the current on-line cart session;
a time duration of the current on-line cart session;
a time difference between the user click inputs; and
a total number of items added to the on-line cart associated with the website.

6. The method as recited in claim 4, wherein the session features of the predictive model include at least: a time duration since a last purchase, a time duration since a previous on-line cart session, and a mean session length of the past on-line cart sessions.

7. The method as recited in claim 1, wherein said providing the notification that the current on-line cart session has ended includes the analytics application initiating the notification to a marketer associated with the website that the current on-line cart session associated with the user has ended.

8. The method as recited in claim 1, wherein the predictive model is developed based on the multiple previous users as a representation of any subsequent user that initiates an on-line cart session.

9. The method as recited in claim 1, wherein said developing the predictive model comprises:
determining user features and session features of the past on-line cart sessions and the user website interactions; and
training the trained classifier based on the statistical distribution, the user features, and the session features of the past on-line cart sessions and the user website interactions.

10. A device implemented to identify when a current on-line cart session associated with a user has ended and provide an indication of when to retarget the user, the device comprising:
a memory configured to maintain user click inputs captured from one or more pages of a website and maintain a data set of past on-line cart sessions and user website interactions of multiple previous users, the user click inputs including adding an item for purchase to an on-line cart associated with the website;
a processor to implement an analytics application that is configured to:
predict, using a predictive model with a trained classifier, whether a previous user click input is a last user click input associated with the current on-line cart session, the last user click input indicating an end of the current on-line cart session, the prediction based at least in part on a duration of inactivity during the current on-line cart session, the predictive model developed by determining a statistical distribution from the data set, wherein the statistical distribution is based on a time duration between successive user click inputs and a time duration after the last user click input until a defined end of a past on-line cart session, wherein the trained classifier is trained based at least in part on the statistical distribution; and
in response to the prediction that one of the user click inputs is the last user click input, provide a notification that the current on-line cart session has ended.

11. The device as recited in claim 10, wherein the analytics application is configured to initiate retargeting the user associated with the user click inputs and the current on-line cart session in response to the prediction of the last user click input associated with the current on-line cart session.

12. The device as recited in claim 10, wherein the analytics application is configured to predict the last user click input associated with the current on-line cart session based on the predictive model, and based on user features and session features of the current on line cart session.

13. The device as recited in claim 12, wherein the user features and the session features of the current on-line cart session comprise one or more of:
a number of the user click inputs in the current on-line cart session;
a time duration of the current on-line cart session;
a time difference between the user click inputs; and
a total number of items added to the on-line cart associated with the website.

14. The device as recited in claim 12, wherein the analytics application is configured to initiate the notification to a marketer associated with the website that the current on-line cart session associated with the user has ended.

15. The device as recited in claim 10, wherein the predictive model is developed based on the multiple previous users as a representation of any subsequent user that initiates an on-line cart session.

16. The device as recited in claim 10, wherein to develop the predictive model, the analytics application is configured to:
determine user features and session features of the past on-line cart sessions and the user website interactions; and
train the trained classifier based on the statistical distribution, the user features, and the session features of the past on-line cart sessions and the user website interactions.

17. A method implemented by an analytics application on a server device to develop a predictive model that is utilized to identify when a current on-line cart session associated with a user has ended and provide an indication of when to retarget the user, the method implemented by the analytics application comprising:
obtaining a data set of past on-line cart sessions and user website interactions of multiple previous users;
determining a statistical distribution from the data set of the past on-line cart sessions and the user website interactions, the statistical distribution based on a time duration between successive user click inputs and a time duration after a last user click input until a defined end of a past on-line cart session;
determining user features and session features of the past on-line cart sessions and the user website interactions;
training a classifier based on the statistical distribution, the user features, and the session features of the past on-line cart session and the user website interactions;
capturing user click inputs on one or more pages of a website during the current on-line cart session, the user click inputs including adding an item for purchase to an on-line cart associated with the website;
utilizing the predictive model to predict whether a previous user click input is the last user click input associated with the current on-line cart session, indicating an end of the current on-line cart session; and in response to the prediction that one of the user click inputs is the last user click input, providing a notification that the current on-line cart session has ended.

18. The method as recited in claim 17, further comprising: developing the predictive model based on the multiple previous users as a representation of any subsequent user that initiates an on-line cart session.

19. The method as recited in claim 17, wherein said providing the notification that the current on-line cart session has ended includes initiating the notification to a marketer associated with the website that the current on-line cart session associated with the user has ended.

20. The method as recited in claim 17, wherein the session features of the predictive model include at least: a time duration since a last purchase, a time duration since a previous on-line cart session, and a mean session length of the past on-line cart sessions.

* * * * *